United States Patent [19]

Pizzorno

[11] 4,197,068

[45] Apr. 8, 1980

[54] APPARATUS FOR MOLDING VEHICLE TIRES

[75] Inventor: Augusto Pizzorno, Milan, Italy

[73] Assignee: Industrie Pirelli S.p.A., Milan, Italy

[21] Appl. No.: 905,943

[22] Filed: May 15, 1978

[30] Foreign Application Priority Data

May 19, 1977 [IT] Italy ............................ 23744 A/77

[51] Int. Cl.[2] ..................... B29C 5/00; B29H 3/08; B29H 5/02

[52] U.S. Cl. .............................. 425/130; 425/589; 425/577; 425/34 R; 425/35; 425/49

[58] Field of Search ............... 425/32, 34, 51, 35, 425/52, 589, 129 S, 130

[56] References Cited

U.S. PATENT DOCUMENTS

| 2,476,884 | 7/1949 | Maynard | 425/52 X |
|---|---|---|---|
| 2,672,914 | 3/1954 | Weigold et al. | 425/32 X |
| 2,710,425 | 6/1955 | Rhodes | 425/34 R |
| 3,302,243 | 2/1967 | Ludwig | 425/129 S X |
| 3,645,655 | 2/1972 | Benege | 425/35 |
| 3,676,621 | 6/1972 | Fukuoka | 425/129 S X |
| 3,915,608 | 10/1975 | Hujik | 425/129 S X |
| 4,052,496 | 10/1977 | Goodfellow | 425/DIG. 44 |
| 4,057,446 | 11/1977 | Goodfellow | 425/51 X |
| 4,059,375 | 11/1977 | Koch et al. | 425/589 |

*Primary Examiner*—J. Howard Flint, Jr.
*Attorney, Agent, or Firm*—Stevens, Davis, Miller & Mosher

[57] ABSTRACT

The invention provides an apparatus for molding vehicle tires. Component parts of the tire are molded separately in molds having different shells but using the same core. The parts of the tire are at least partially vulcanized at the same time as they are molded.

14 Claims, 11 Drawing Figures

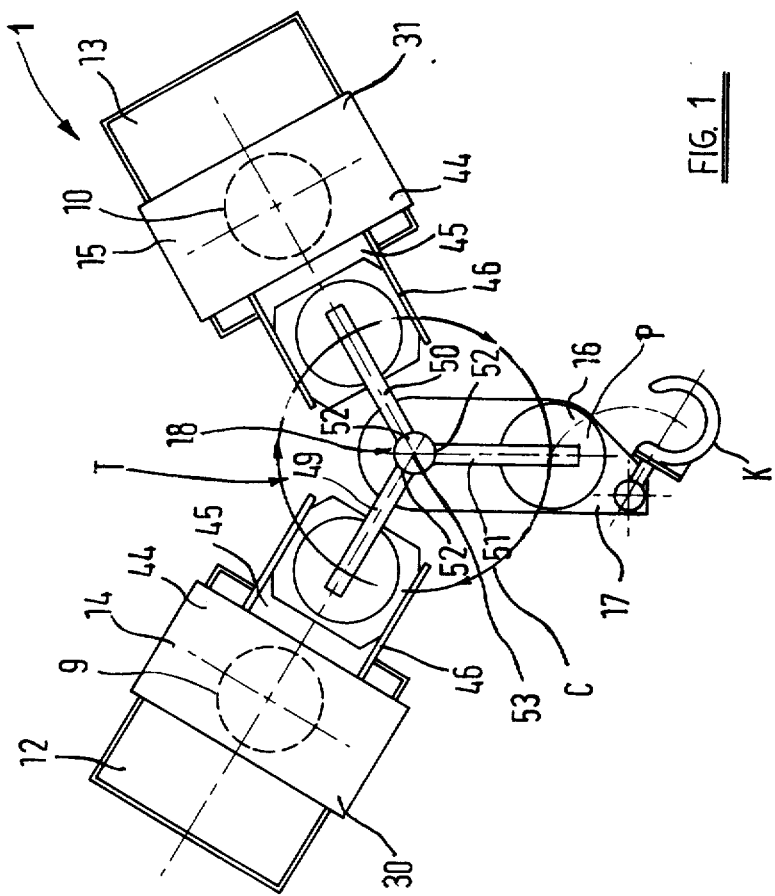

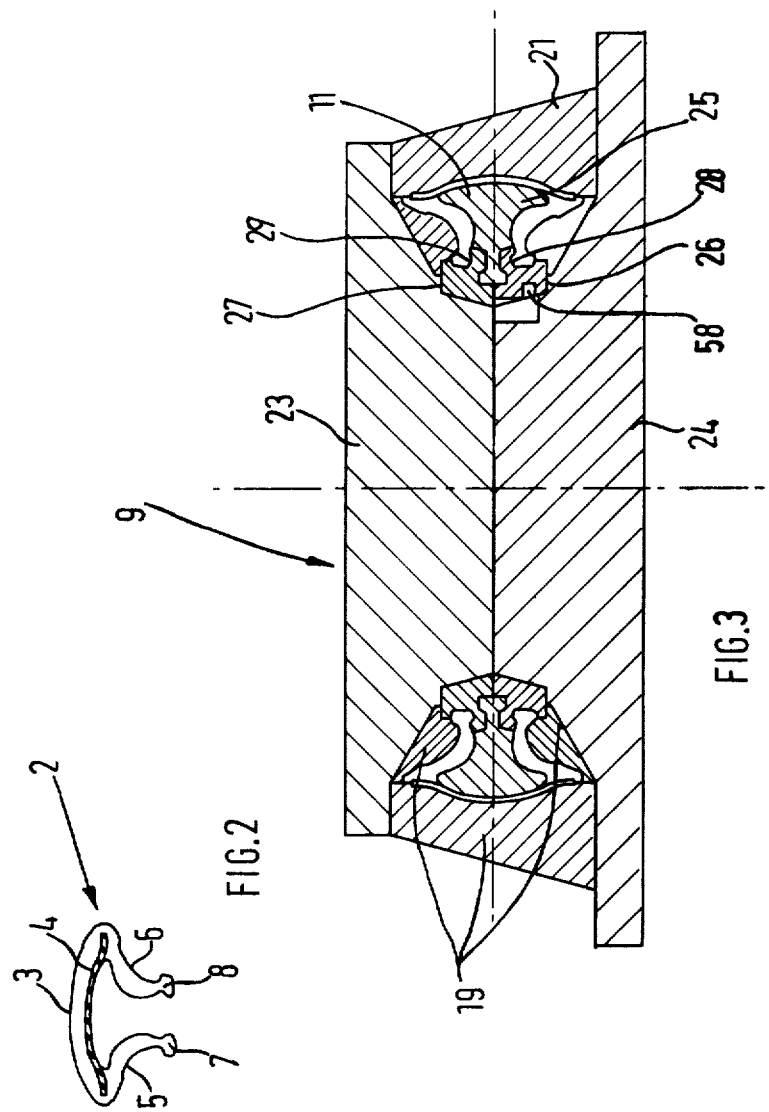

APPARATUS FOR MOLDING VEHICLE TIRES

This invention relates to a process and apparatus for molding vehicle tires. More particularly, the invention relates to an apparatus for molding tires by molding a plurality of parts of the tire in successive steps in different mold shells but with the same core and in such a way that the steps of making the different parts of a plurality of tires takes place at the same time in all the molds.

The processes and the relative apparatus for the production of a vehicle tire by molding parts thereof separately can be used to advantage when it is required to mold the various parts of the tire with different compositions, e.g., to give the tread chemico-physical characteristics which are different from those of the sidewalls. These processes can be operated in different ways, e.g., by injection molding, i.e., at high pressure, at low pressure or by pouring.

A known process, e.g., in two stages, is based on the use of a single press, inside which a mold is located which is designed to shape the walls of the tire in the first stage and the tread in the second.

The mold uses two sets of different segments, the first of which is used only in the first stage to prevent the formation of the tread and the second only in the second stage to allow the tread to form.

This process can create some difficulties in molding tires on an industrial scale because special equipment having characteristics which permit the two sets of segments to be changed quickly and automatically is required.

There are also numerous other processes, although in general terms it can be said that the processes with several stages known up to now also present various unsolved problems. For example, the known processes require that an excessive number of operations be carried out manually with attendant high costs and require the use of complicated apparatus.

Therefore, the objective of this invention is an apparatus for producing tires in several stages which constitutes an alternative to the process mentioned, based on the use of a single press with replacement of the segments and which provides improvements in general compared with those known, for overcoming the problems mentioned.

It is an object of this invention to provide an apparatus for molding a vehicle tire which is devoid of the foregoing disadvantages. Another object of the invention is to provide an apparatus for making a vehicle tire by molding parts thereof separately which process makes it possible to eliminate manual steps heretofore required.

Other objects will become apparent from the following description with reference to the accompanying drawing wherein FIG. 1 is a plan view of an embodiment of apparatus for molding a vehicle tire in two stages;

FIG. 2 is a cross-section of an embodiment of a tire made in the apparatus of FIG. 1.

FIGS. 3 and 4 illustrate in section molds for the two stages;

Figure 4:
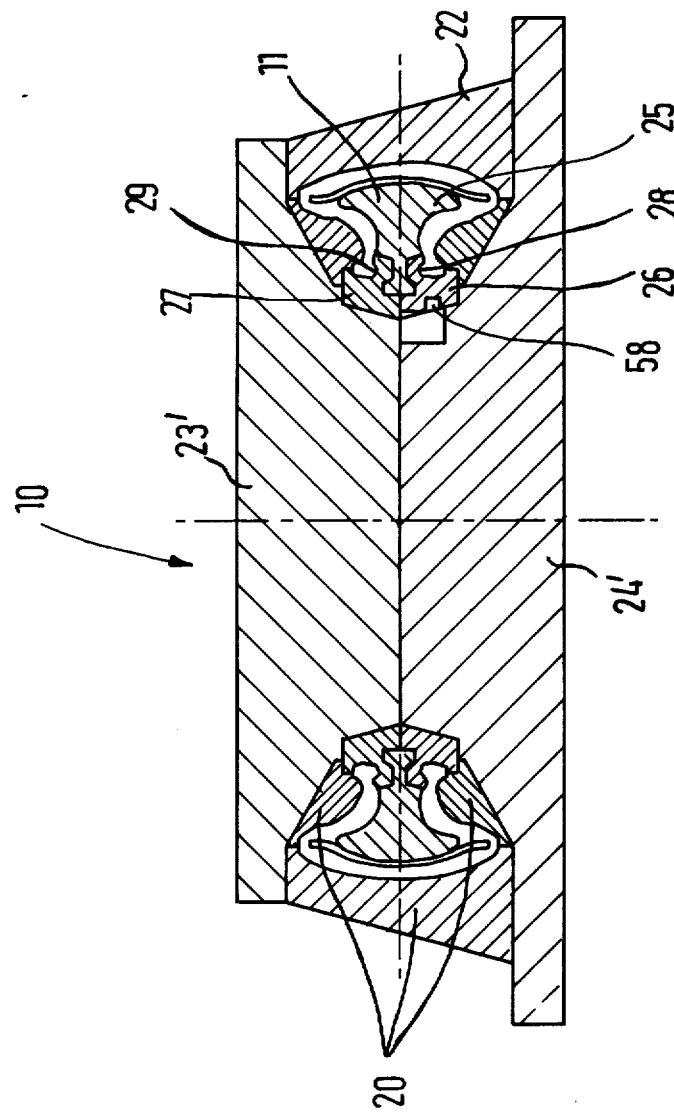

The foregoing objects and others are accomplished in accordance with the invention by providing an apparatus for producing vehicle tires by molding a plurality of parts of the tire in successive molding stages and at different stations, where an individual part of the tire is molded in a mold, between a core designed to define the internal profile of the tire and an external shell, which varies from stage to stage, designed to define the external profile of the individual part of the tire, the said process being characterized by the fact that:

(a) each individual part of the tire is vulcanized at least partially and simultaneously with the molding stage;

(b) the core is removed, with the part of the tire already molded and at least partially vulcanized, from the external shell at a first station, and introduced at successive stations inside additional external shells for molding the various parts of the external profile of the tire;

(c) the core with the completely vulcanized tire is removed from the final molding station;

(d) the core is removed from the tire at a handling station; and (e) stages (a), (b), (c) and (d) are repeated for the production of a new tire.

The process has the fundamental characteristic of including stages in which individual parts of the tire are molded and vulcanized separately but at the same time.

This characteristic makes it possible to provide the portion of the tire present at each station with a high degree of stability so that although opening the various parts of the external shell may produce mechanical dragging actions on that portion of the tire, it does not cut the elastomeric structure.

Consequently, the motions of opening the mold at each station, until the end of the stage when molding and vulcanization takes place at the same time, can be completed with maximum speed, and with considerable advantage, because with the reduction in idle times between each stage, industrial production of the tires is increased.

Preferably, this process is characterized by the fact that it includes the following operations between the stages of molding and vulcanizing:

(A) supporting the core in a control zone which is at a distance from the molding zone of the relative station;

(B) raising the core in the direction of the relative vertical axis;

(C) rotating the core in relation to a vertical reference axis which is equidistant from the centers of the said control zones of the molding station and from the center of the handling station;

(D) stopping the rotation described in (C) when the core is aligned with its own vertical axis with the center of a successive control zone or of the handling station which follows the last control zone; and (E) lowering and placing the core on the said successive control zone or handling station.

Preferably, the said process is characterized by the fact that different parts of various tires are produced at the same time in each mold and that the parts already produced are moved at the same time from one mold to the next until the various tires have been completely produced.

In particular, the process can be applied in the manufacture of tires in two single stages of molding and vulcanizing - a first stage for producing the walls and a second stage for producing the tread of the tire.

Preferably, the process in accordance with the invention includes stages of molding by injecting a plastomeric or elastomeric material.

Also preferably, the process is characterized by the fact that it includes stages of molding with plastomeric or elastomeric compounds containing reinforcements intended to provide the tire with special characteristics of strength.

The said reinforcement components can be distributed along predetermined circumferential lines of the tire, e.g., in an internal annular zone of the tread.

With the apparatus of the invention, a tire is produced having walls which are inwardly concave or convex, with beads including reinforcement components, a completely of plastomeric or elastomeric material, with an annular structure to reinforce the tire.

The invention also provides an installation for producing tires by molding a plurality of parts of the same tire in successive stages. The installation has a plurality of molds. All of the molds contain the same core and each mold has a different external shell to define the profile of an individual part of the tire. The installation is characterized by the fact that it includes a plurality of fixed molding stations, means for vulcanizing the tire attached to each mold, means of handling the core to which the completely produced tire is attached, a fixed handling station to which the said handling means are attached, and means for moving the core between the stations.

Preferably, the handling means include components designed to dismantle a rigid core into segments and further components to open out or spread the walls of the tire arranged around the core, particularly when the tire required to be produced has a large number of undercuts.

The invention provides an installation of apparatus 1 (FIG. 1) for producing tires by molding a plurality of parts of the same tire in successive stages in different molds and the same core, e.g., an installation for producing a tire of any type in two stages, i.e., a tire of the traditional type or even with considerable undercuts, with inwardly concave or convex walls.

Still as an example, the invention is described with reference to producing a tire 2 (FIG. 2) by injection, consisting of a tread 3, the width of which is greater than that of any other part of the tire, an annular reinforcement structure 4, two walls 5 and 6, of a highly accentuated, inwardly convex form and two beads 7, 8, substantially of elastomeric material.

The installation 1 (FIG. 1) has two molds 9, 10 (FIGS. 1, 3, 4), both with a rigid core 11 (FIGS. 3, 4), two fixed molding stations 12, 13 (FIG. 1) with molds 9 and 10, vulcanizing means 14, 15, attached to mold 9 and mold 10 respectively, means 16 of handling core 11, a handling station 17 in which handling means 16 are arranged, further means 18 for moving the core for each mold between the molding and handling stations, are arranged, respectively.

The said molds 9 and 10 are used for molding the walls and tread of the tire respectively and both have the same rigid cores 11, each of which is introduced in succession, starting from handling station 17, in each of the two molds for producing the same tire. Molds 9 and 10 also include different external shells 19 and 20 (FIGS. 3, 4) designed to define the external profile of the walls and of the tread, respectively. The said external casing 19 consists of a plurality of parts 21, which can be dismantled radially, and of two bases 23, 24, which can be parted in order to allow access and maneuverability inside the mold. Similarly, casing 20 for mold 10 (FIG. 4) consists of parts 22 which can be dismantled radially, and bases 23', 24'.

The core 11 has a plurality of segments 25 (FIGS. 3, 4) designed to form the internal profile of the walls of the tire and the circumferential zone inside the tread and two annular components, upper and lower, 26, 27, the surfaces 28, 29 of which are designed to form the axially internal surfaces of the beads of the tire.

Each of the molds in accordance with the inventive principle described is attached to its own vulcanizing means 14, 15 (FIG. 1) in order to vulcanize, and therefore consolidate, the plastomeric or elastomeric material of the walls and of the tread of the tire, at least partially in the first stage and totally in the second stage.

The vulcanizing means 14 and 15 are parts of two presses 30, 31 (FIGS. 5, 6), inside which molds 9 and 10 are housed.

Each of the presses has two hot steam panels 32, 33, connected to an upper and lower plane 34, 35, respectively, which can be parted along vertical axis X—X of each press.

The planes 34, 35 in each press coincide with bases 23, 24 and 23', 24' of each mold and the relative external shell is arranged between them.

In accordance with a preferred embodiment, each of the external shells consists of a plurality of segments which can be automatically expanded or contracted radially when the press is opened or closed.

The mechanism for these radial movements of the segments is operated by the use of special inclined surfaces 36 of the press and 37 of the segments forced to slide in contact with each other when the press is opened or closed, as described in Italian Pat. No. 658,679 and the corresponding U.S. Pat. No. 3,337,918 granted Aug. 29, 1967 and Re. Pat. No. 27,513 granted Oct. 24, 1972.

The press can have two planes, upper and lower, connected to the core of each mold in a different way to that now described.

Figure 7:
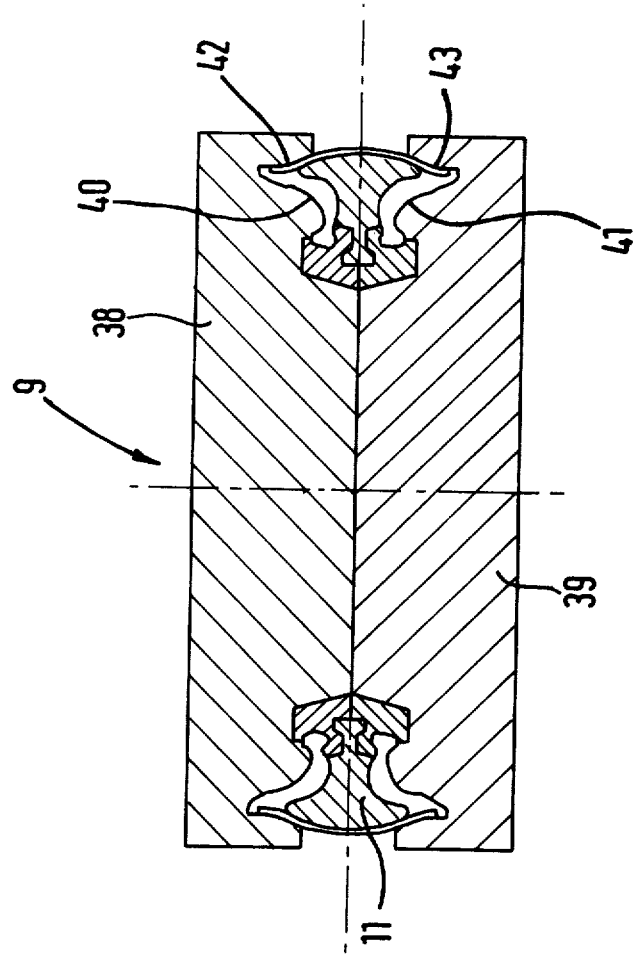
FIG. 7 is an illustration in section of a mold used in a single stage.

For example, mold 9 inside press 30 can have an external shell (which is 7) consisting of two single parts 38, 39 (FIG. 7), upper and lower, called "cheeks", which are integral with the upper and lower plane.

In this case, the cheeks have internal surfaces 40, 41 designed to define the external profile of the walls of the tire and other surfaces 42, 43 designed to prevent the formation of the tread.

This type of external shell is advantageous from an economic point of view because of the small number of parts of the mold compared with those of any other external shell with segments, as can be seen, for example, in comparison with installations for producing tires in two stages with a single press, where it is necessary to use external segments and to replace a first set of segments, designed to prevent formation of the tread in the first stage, by a second set, designed to allow the tread to be made.

In the installation in accordance with the invention, each of the presses has a single injector, and this characteristic makes the total cost of the installation practically the same as that of the installations with two stages which use a single press and two injectors.

For greater clarity, it is pointed out that the injection equipment for a press in the specific case has an extruder designed to inject an appropriate plastomeric or elastomeric compound through channels, the ends of which open into the molds, e.g., adjacent to the beads in mold 9 and adjacent to the surface of the tread in mold 10.

Having described the parts of the installation designed to carry out the stages for producing the walls and the tread, we shall now describe below the other parts for moving the core of mold 9 with the walls of a first tire from the first molding station to the second, 12 and 13, respectively (FIG. 1), the core of mold 10 with a second tire already produced, from the second molding station 13 to the handling station 17 and an additional core for producing a third tire from the handling station 17 to the first molding station 12.

The installation 1 (FIG. 1) has a first operative section 44 where the molding and vulcanizing stage is carried out in each press, a second operative section 45, or control zone, where the core with the part of the tire already molded and vulcanized is arranged on each of the lower planes of the press moved here from the first operative zone.

Figure 5:
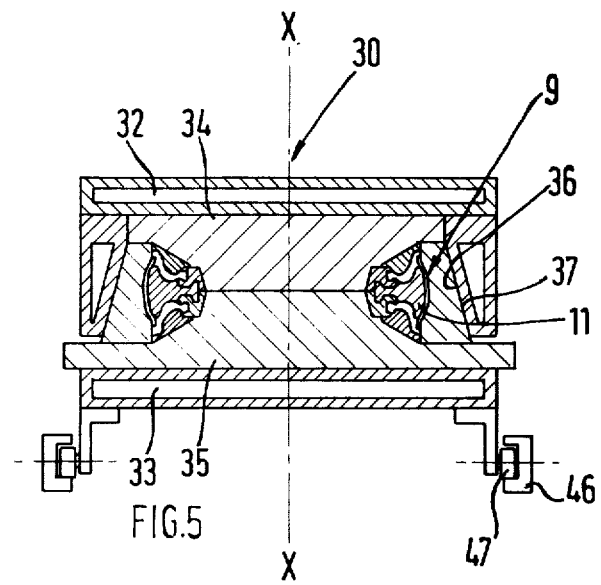
FIGS. 5 and 6 illustrate in section presses for the two stages.
Figure 6:
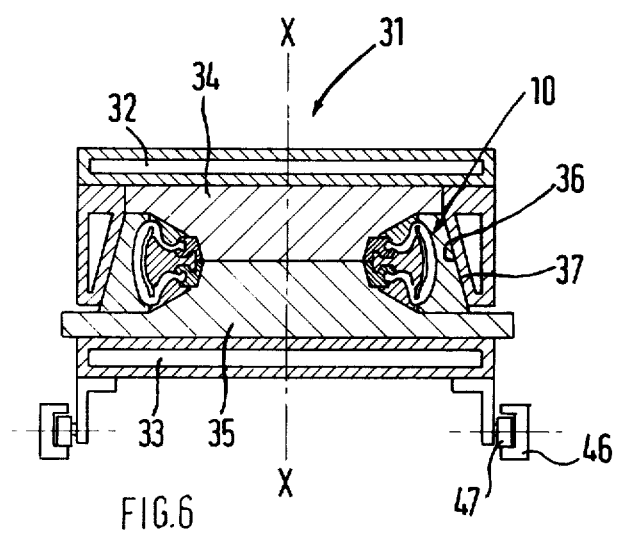

The two operative sections or control zones 44, 45 (FIG. 1) are connected to each other by means of suitable rails 46, (FIGS. 1, 3, 4) on which each of the lower planes of press 30 or 31 can move by means of wheels 47 (FIGS. 5, 6).

The centers of the two control zones and of the handling station 17 are arranged along a circumferential line C, inside which the means 18 for moving the core between the stations, are located.

This arrangement of the installation makes it possible to house the various items of equipment used between the molding and vulcanizing stages, in a restricted space.

Figure 8:
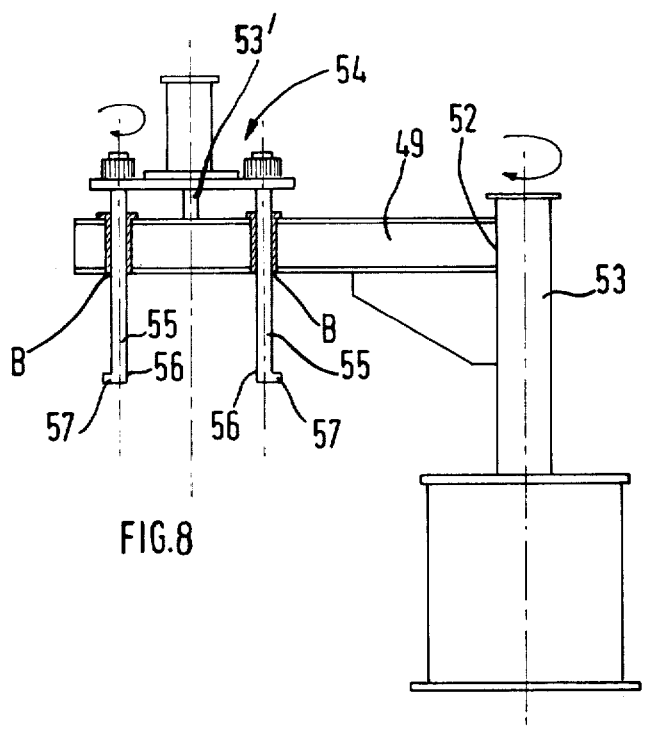
FIG. 8 illustrates in detail a device which engages the core of each mold.

The means 18 for moving the core consist of a T system (FIG. 1) with three horizontal arms 49, 50, 51, each of which is connected (FIG. 8) at a first end 52 to a single vertical central shaft 53 (FIGS. 1, 8) rotating around its own axis by means of a motor unit which is not illustrated.

Each of the arms has suitable means 54 (FIG. 8) for engaging the core, designed to be moved parallel to the vertical shaft 53 by means of a cylinder with piston 53' and to be introduced inside the annular space of the core when it is arranged in the said second control zone 45 of each molding station or in the handling station 17 (FIG. 1).

In a preferred embodiment, the engaging means have at least two rods 55 free to slide inside appropriate sleeves B of the respective arm and to rotate around their own axis.

At end 56, each rod 55 has a tooth 57 designed to be introduced into a corresponding slot 58 (FIGS. 3, 4) of the lower annular component of the core and therefore, as explained, the rods can support the core with the parts of the tire connected to it.

Installation 1 also has handling means 16 (FIG. 1) for dismantling the core with the tire already produced and for preparing a new core for the production of a new tire.

The said means 16, which can be of any type, are used when the core is placed on an appropriate handling plane P (FIG. 1) after it has been transported to handling station 17 by means of rods 55 of one of the three arms of the T system.

In accordance with the preferred embodiment described here, the means 16 are also designed to transport the core to which the tire is connected and have devices which are just the same as those described in U.S. patent application Ser. No. 830,870 filed Sept. 6, 1977 assigned to the assignee of this application.

In particular, in this case it is summarized briefly below that the means 16 have an upper frame and a lower plane with a support plane for the core. The upper frame is mobile in relation to the lower frame and in substance comprises a single device for opening out or spreading the walls of the tire at successive times and for transporting the core when the upper frame moves in relation to the fixed frame.

This single device is connected to arm 51 of the T system (FIG. 1) and has, among other things, rods designed to slide in relation to the arm and provided with teeth to fit into the slots in the lower annular component of the core. These rods also have the function of spreading first the lower wall and then the upper wall of a tire already made.

The lower frame has components for positioning an annular reinforcement structure for a tread around a core for a new production cycle, components for dismantling the segments of the core radially and for assembling them again, as explained in the aforesaid U.S. patent application.

Having described the installation, the function is now described, starting when presses 30, 31 at molding stations 12, 13 (FIG. 1) are ready to be put into operation and the handling means 16, having removed a tire already produced from the relative core, prepare the same core for the manufacture of a new tire.

Under the conditions indicated, mold 9 inside press 30 has an empty space between core 11 and external shell corresponding to the walls of a first tire to be produced, whereas mold 10 inside press 31 (FIG. 6) has a second rigid core 11 around which the walls of a second tire already molded and at least partially vulcanized, are arranged, and a free space for the formation of the tread of the same second tire.

Therefore press 30 is ready to start the first stage of manufacture of a first tire and press 31 for the second stage of a second tire.

These stages are carried out by injecting elastomeric material at high pressure into both the free spaces of molds 9 and 10 and at the same time by producing the heat required for the at least partial vulcanization of the walls of the first tire in press 30 and total vulcanization of the entire second tire in press 31 by means of hot panels 32, 33 (FIGS. 5, 6).

Therefore, at the end of the first stage in press 30 and of the second stage in press 31, the product arranged around the first core and the second core 11 consists of stable elastomeric structures.

Both presses 30 and 31 are then opened by moving the upper planes 34 in an upwardly direction and thereby expanding the segments 21, 22 of the respective external shells 19 and 20. During this expansion, and also as the result of the high speed of opening the presses, any return forces of the segments on the walls of the first tire or on the second tire, arranged around the respective cores, do not cause cuts or damage to the elastomeric compound which has been already stabilized by the fact that the molding and vulcanizing operations were carried out in the same stage.

Figure 9:
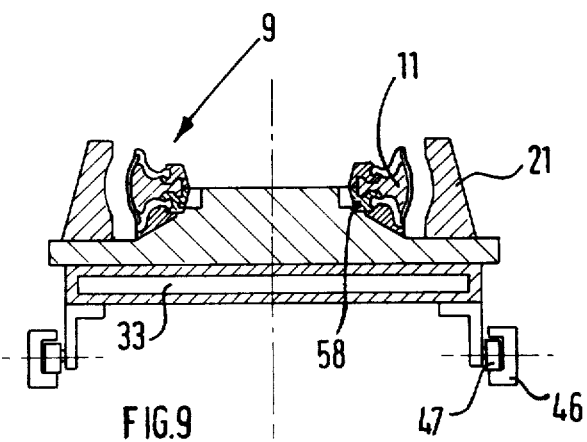
FIG. 9 illustrates in section the lower part of the press in the first stage when it is moved in relation to the upper part.

In a further operation, the respective lower planes 35 are removed from presses 30, 31, and when they have been moved along rails 46 (see FIG. 9 for press 30) by means of wheels 47 (FIGS. 5, 6), the centers of molds 9 and 10 are aligned with the centers of each second operative zone or control zone 45 of the respective molding station.

The subsequent operations take place as follows:

First of all, rods 55 (FIG. 8) on arms 49, 50, 51 of the T system (FIG. 1) are lowered until the respective teeth 57 are in the proximity of slots 58 (FIGS. 3, 4) of the lower annular components of the first and second core 11 and of a third core already set up at handling station 17, ready to make a third tire.

The rods are then rotated so that the said teeth are introduced into the said sots 58 (FIGS. 3, 4) of the lower annular components of each mold.

Figure 10:
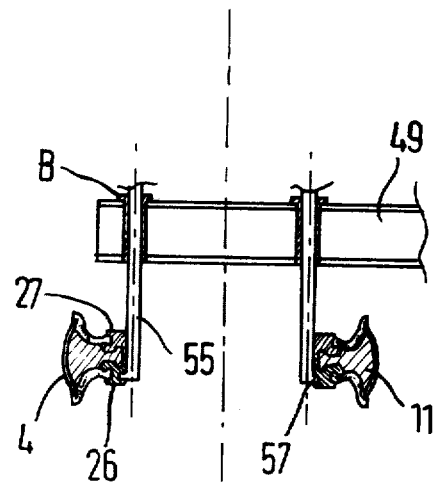
FIG. 10 illustrates the core with the walls of the tire removed from the mold in the first stage.
Figure 11:
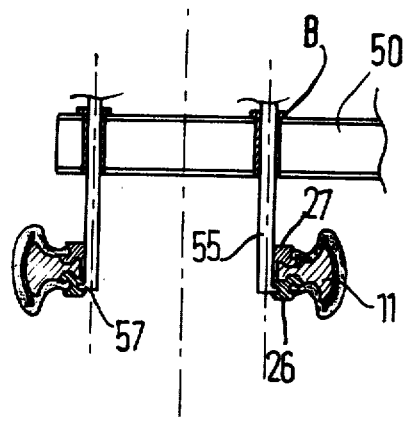
FIG. 11 illustrates the core with a molded tire removed from the mold in the second stage.

Then the rods with the respective cores (FIGS. 10, 11) are lifted and vertical central shaft 53 (FIG. 8) made to rotate so that arms 49, 50, 51, and the cores connected to them, rotate; this rotation movement is stopped when the first core 11 with the walls of the first tire is aligned with the center of the second control zone 45 of molding station 13 (FIG. 1), the second core 11 with the second tire is at the center of handling station 17 and the third core is at the center of the second control zone 45 of the first molding station 12.

In the following cycles, first the rods on each arm are lowered, then the cores connected to them are placed on the lower planes of presses 30 and 31 and on support plane P of handling means 16. Then the entire T system is rotated in the opposite direction to that previously so that the third arm 51, on which the device for opening out the walls of a tire is mounted, goes to handling station 17 and then the core around which the second tire is arranged, is handled.

Finally, both the two lower planes of the presses are taken from the second control zones 45 to the first operative zones 44 and then presses 30 and 31 are closed again for the first stage of forming the walls of a third tire and for carrying out the second stage of forming the tread and of finally completing the first tire, respectively.

These stages take place as already explained and are therefore not discussed further. In another form of carrying out the process, the lower planes of the press can be moved into the molding position even before the device for opening out returns to the handling station.

With regard to handling the core, around which the second tire is arranged, it is mentioned briefly below that the relative operations are the same as those already described in U.S. patent application Ser. No. 830,870 filed Sept. 6, 1976, i.e., to sum up:

First of all, the lower wall of the tire and then the upper wall are opened out by means of the said device attached to the third arm, first of all by moving the lower annular component attached to the core away from the central horizontal plane of the core and then the upper component, respectively.

The segments of the core are then contracted radially and then the tire is removed from the core using suitable unloading components K (FIG. 1).

Finally, the core is re-assembled on support plane P (FIG. 1) and a new annular reinforcement structure for producing a new tire is placed round it.

One advantage of the installation now described is contained in the special multi-arm T system (FIG. 1) and in the relative method of operation. In effect, the solution of rotating the T system only between the operative zone 45 of the first molding station 12 and handling station 17 and vice-versa makes it possible to provide just one of the arms with a single device for transporting the core and for spreading the walls of the tire.

As the function of spreading the walls of a tire, like the one illustrated in FIG. 2, for example, requires considerable forces and therefore an adequate dimensioning of the parts which carry out this operation, it is obvious how the presence of a single device is both economical and simple compared with the other possible solutions.

The installation in accordance with this invention has made it possible to overcome the various difficulties which are usually found in the production of tires on an industrial scale, by molding a plurality of parts of the same tire in successive stages by using different molds and the same core.

In general terms, as the injection or molding times can be reduced to very low values, whereas the vulcanizing times are longer, it has resulted in the use of molds in which only the molding stages are carried out and to a further plurality of vulcanizing means in which the tires already molded are placed.

However, this solution, which results in increased costs due to the plurality of vulcanizing devices and the difficulty in interconnecting the various items of equipment, has meant that it has not been considered completely satisfactory to produce a single tire with several molds and only a single core and therefore up to now there has been prejudice with regard to this method of producing tires.

The installation in accordance with the invention has overcome this prejudice in that, as described, it combines the stage of molding and vulcanizing each individual part of the tire in each mold and, together with this characteristic, uses a completely special system of rotating arms which makes it possible to transfer the core of one mold to the next immediately, in accordance with a solution which is simple and which can be completely automated.

Therefore, the overall characteristics of the installation, by making it possible to overcome the prejudice and the difficulties of the past, are also novel.

The installation in accordance with the invention also has the advantage that it can be applied to the production of tires of a different structure without altering the principal equipment.

Although some embodiments of this invention have been illustated and described, it is to be understood that all the possible variations to which one skilled in the art has access, e.g., the use of a system rotating with a plurality of arms which are the same as each other, each of which can also have a device for opening out the walls of a tire, are included within its scope. In this case, such a system with several arms always rotates in the same direction and obviously each of the arms arrives in cycle to the handling station and spreads the walls of the tire in accordance with the operating conditions indicated.

What is claimed is:

1. An apparatus for making tires having sidewalls and a tread, said apparatus comprising:
   a plurality of substantially identically shaped rigid cores;
   a first fixed station for molding and vulcanizing a first part of each tire, said station having a first mold which defines the external profile of the first part of the tire, a first vulcanizing means for the first part and a first transfer section;
   a second fixed station, separate from said first station, for molding and vulcanizing a second part of each tire after the first part is molded and vulcanized at the first station, said second station having a second mold, different in shape from said first mold, which defines the external profile of the second part of the tire, a second vulcanizing means for the second part of the tire, and a second transfer section;
   a third handling station, separate from said first and second stations, for removing each core from the respective tire after the second part is molded and vulcanized at the second station;
   means for moving in succession each core to the transfer section of the first station, then from the frist station with the first part of the tire thereon to the transfer section of the second station, then from the second station with the first and second parts of the tire thereon to the handling station;
   said frist transfer section, said second transfer section and said third station being substantially circumferentially spaced about a substantially vertical axis; and
   said moving means comprises a plurality of radially extending arms rotatable in unison about said axis so as to simultaneously move one core with one of the arms to the transfer section of the first station, another core with the first part of the tire with another of the arms to the transfer section of the second station, and yet another core with the first and second parts of the tire thereon to the handling station with yet another of the arms.

2. Apparatus in accordance with claim 1 characterized by the fact that said arms are horizontal, equal to the number of stations, connected at a first end to a single vertical central shaft rotating round its own axis which corresponds to said vertical axis, each arm having means for engaging the core, designed to slide parallel to the shaft and to be introduced into the core when it is located in the transfer section of each molding station.

3. Apparatus in accordance with claim 2, characterized by the fact that the said engaging means for each arm have at least two rods parallel to the axis of the central shaft, each rod having a first end connected to the arm, being free to rotate around its own axis and a tooth near the second end, designed to fit into an appropriate slot in the core.

4. Apparatus in accordance with claim 3, characterized by the fact that one of the arms has rods designed for the further function of opening out the walls of a tire when the core to which the said tire is connected is located at the handling station, and said one arm, with rods suitable for spreading the walls, rotates only from the handling station to the transfer section of the first molding station, and vice-versa.

5. Apparatus in accordance with claim 3, characterized by the face that each of said arms has rods designed for the further function of opening out the walls of a tire.

6. Apparatus in accordance with claim 2, characterized by the fact that each arm has means of engaging an appropriate lower annular component which supports the core.

7. Apparatus in accordance with claim 1, characterized by the fact that the said handling station has components designed to dismantle a rigid core into segments.

8. Apparatus in accordance with claim 1, characterized by the fact that the said handling station has components for opening out the walls of the tire.

9. Apparatus in accordance with claim 1, characterized by the fact that the said handling station has components for unloading the tire already produced.

10. Apparatus in accordance with claim 1, characterized by the fact that the said handling station has components for positioning an annular reinforcement structure of a tire around the core.

11. Apparatus in accordance with claim 1, characterized by the fact that the said first and second vulcanizing means are inside presses to which the mold at each molding station is connected.

12. Apparatus in accordance with claim 11, characterized by the fact that each press is equipped with a single injector.

13. Apparatus in accordance with claim 1, characterized by the fact that the first station is for the production of the tire walls, and the second station is for the production of the tread of the tire.

14. An apparatus for making tires having sidewalls and a tread, said apparatus comprising:
   a plurality of substantially identically shaped rigid cores;
   a first fixed station for molding and vulcanizing a first part of each tire, said station having a first mold which defines the external profile of the first part of the tire, a first vulcanizing means for the first part and a first transfer section;
   a second fixed station, separate from said first station, for molding and vulcanizing a second part of each tire after the first part is molded and vulcanized at the first station, said second station having a second mold, different in shape from said first mold, which defines the external profile of the second part of the tire, a second vulcanizing means for the second part of the tire, and a second transfer section;
   a third handling station, separate from said first and second stations, for removing each core from the respective tire after the second part is molded and vulcanized at the second station;
   means for moving in succession each core to the transfer section of the first station, then from the first station with the first part of the tire thereon to the transfer section of the second station, then from the second station with the first and second parts of the tire thereon to the handling station;
   said first transfer section, said second transfer section and said third station being substantially circumferentially spaced about a substantially vertical axis;
   said moving means comprises a plurality of radially extending arms rotatable in unison about said axis so as to simultaneously move one core with one of the arms to the transfer section of the first station, another core with the first part of the tire with another of the arms to the transfer section of the second station, and yet another core with the first and second parts of the tire thereon to the handling station with yet another of the arms;
   said first mold and said first vulcanizing means are radially outwardly of said transfer section; and
   said second mold and said second vulcanizing means are radially outwardly of said second transfer section.

* * * * *